US012712785B1

(12) United States Patent
Deb et al.

(10) Patent No.: US 12,712,785 B1
(45) Date of Patent: Aug. 18, 2026

(54) CLOUD-BASED NETWORK FUNCTION CHAIN OPTIMIZATION

(71) Applicant: Amazon Technologies, Inc., Seattle, WA (US)

(72) Inventors: Bashuman Deb, Aldie, VA (US); Omer Hashmi, Bethesda, MD (US); Thomas Nguyen Spendley, Rockville, MD (US); Ramin Ali Dousti, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 63 days.

(21) Appl. No.: 18/618,989

(22) Filed: Mar. 27, 2024

(51) Int. Cl.
*H04L 41/122* (2022.01)
*H04L 43/026* (2022.01)
*G06F 9/50* (2006.01)

(52) U.S. Cl.
CPC .......... *H04L 41/122* (2022.05); *H04L 43/026* (2013.01); *G06F 9/5077* (2013.01)

(58) Field of Classification Search
None
See application file for complete search history.

(56) References Cited

U.S. PATENT DOCUMENTS 9,503,391 B2 11/2016 Xia et al.
9,628,380 B2 4/2017 Xia et al.
9,647,909 B2 * 5/2017 Kuan .................... H04L 43/045
10,048,977 B2 8/2018 Palermo et al.
10,122,583 B2 * 11/2018 George .................. G06Q 50/06
10,432,537 B2 10/2019 Zhang et al.
10,797,989 B2 10/2020 Tillotson et al.
10,979,361 B2 4/2021 Abhigyan et al.
11,063,847 B2 7/2021 Wang et al.
11,165,654 B2 * 11/2021 Oren .................. H04L 41/0893
11,252,105 B2 * 2/2022 Cidon ................. H04L 63/0272
11,425,049 B2 8/2022 Zhang et al.
11,652,742 B2 * 5/2023 Padhye ................... H04L 43/14 370/392
12,348,431 B1 * 7/2025 Chhajer .................. H04L 67/10
2020/0195507 A1 * 6/2020 Han .................... H04L 41/0894
2020/0204492 A1 * 6/2020 Sarva ...................... H04L 67/34
2020/0314015 A1 * 10/2020 Mariappan .......... G06F 9/45558
2020/0382386 A1 * 12/2020 Narendra ............ H04L 41/0897
2022/0321470 A1 * 10/2022 Qian ....................... H04L 45/04
(Continued)

OTHER PUBLICATIONS

Boysen, Elin Sundby et al., "Service-Aware Virtual Network Function placement in Software Defined Networks", 2019 IEEE Wireless Communications and Networking Conference (WCNC), p. 1-7, Apr. 2019 (Year: 2019).*

*Primary Examiner* — Jason D Cardone
(74) *Attorney, Agent, or Firm* — Robert C. Kowert; Kowert, Hood, Munyon, Rankin & Goetzel, P.C.

(57) ABSTRACT

A set of network functions indicated by a client of a networking service for a set of packet flows is analyzed. Based on the analysis, an aggregated network function is generated, such that a result of applying the aggregated network function to a packet is equivalent to a result of applying at least a pair of network functions of the set of network functions to the packet. A packet processing action which comprises applying the aggregated network function is implemented with respect to a particular packet of a flow of the set of packet flows.

20 Claims, 9 Drawing Sheets

(56) References Cited

U.S. PATENT DOCUMENTS

| | | | | |
|---|---|---|---|---|
| 2023/0104368 | A1* | 4/2023 | Miriyala | G06F 9/547<br>726/1 |
| 2024/0007350 | A1* | 1/2024 | Gupta | H04L 41/0895 |
| 2024/0345861 | A1* | 10/2024 | Chaki | H04W 12/088 |

* cited by examiner

Figure 6:
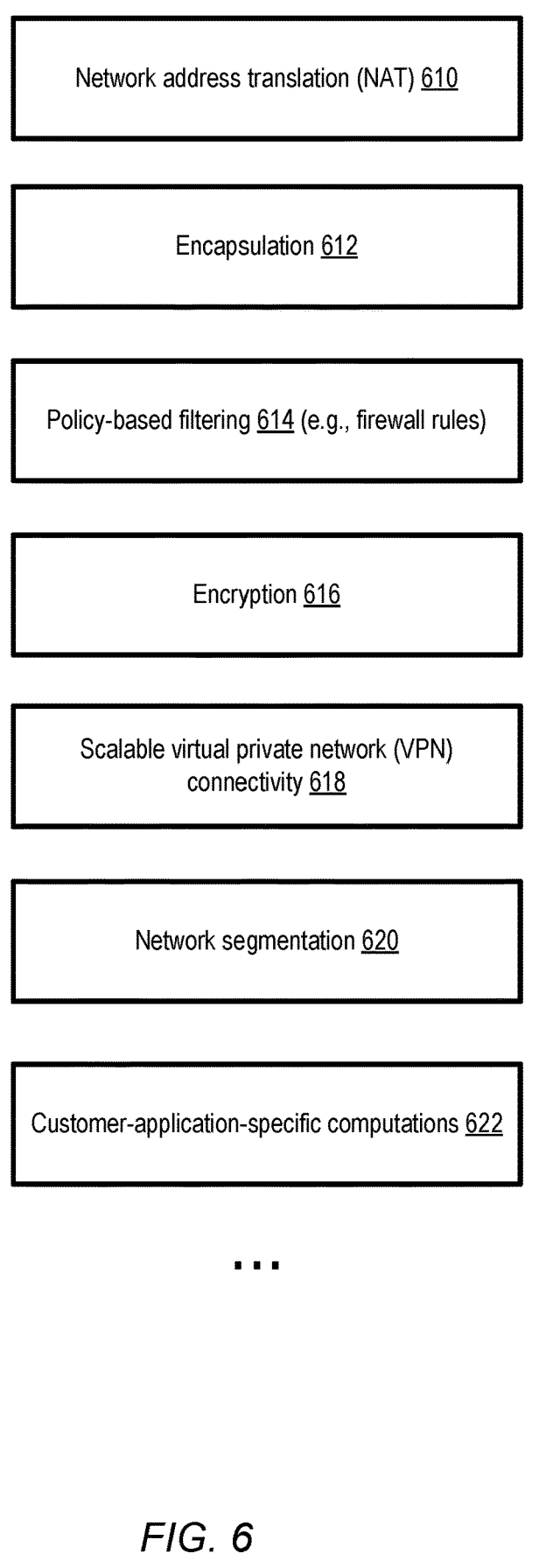

Network address translation (NAT) 610

Encapsulation 612

Policy-based filtering 614 (e.g., firewall rules)

Encryption 616

Scalable virtual private network (VPN) connectivity 618

Network segmentation 620

Customer-application-specific computations 622

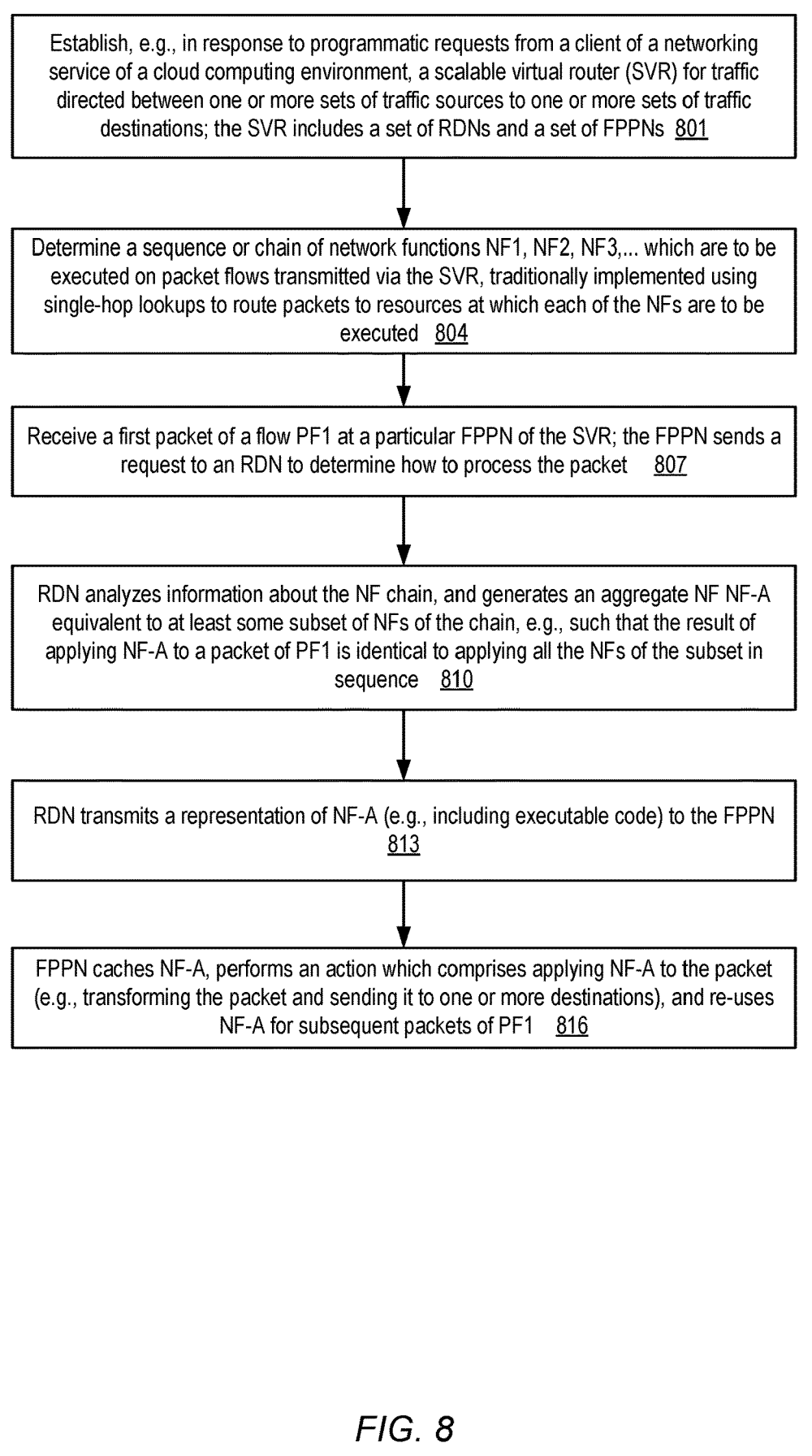

Establish, e.g., in response to programmatic requests from a client of a networking service of a cloud computing environment, a scalable virtual router (SVR) for traffic directed between one or more sets of traffic sources to one or more sets of traffic destinations; the SVR includes a set of RDNs and a set of FPPNs 801

Determine a sequence or chain of network functions NF1, NF2, NF3,... which are to be executed on packet flows transmitted via the SVR, traditionally implemented using single-hop lookups to route packets to resources at which each of the NFs are to be executed 804

Receive a first packet of a flow PF1 at a particular FPPN of the SVR; the FPPN sends a request to an RDN to determine how to process the packet 807

RDN analyzes information about the NF chain, and generates an aggregate NF NF-A equivalent to at least some subset of NFs of the chain, e.g., such that the result of applying NF-A to a packet of PF1 is identical to applying all the NFs of the subset in sequence 810

RDN transmits a representation of NF-A (e.g., including executable code) to the FPPN 813

FPPN caches NF-A, performs an action which comprises applying NF-A to the packet (e.g., transforming the packet and sending it to one or more destinations), and re-uses NF-A for subsequent packets of PF1 816

FIG. 8

CLOUD-BASED NETWORK FUNCTION CHAIN OPTIMIZATION

BACKGROUND

As demand for virtualization-based services at cloud provider networks has grown, more and more networking and interconnectivity-related features have been added to the services. For example, isolated virtual networks referred to as virtual private clouds (VPCs) of virtual machines can be established on behalf of customers, and a variety of logical networking intermediaries (such as Internet gateways for traffic between VPCs and the public Internet, virtual private network (VPN) gateways for traffic between VPCs and customer premises via VPN tunnels, and the like) can be set up. As the networking needs of customer applications continue to evolve, including requirements for various types of network functions, new networking capabilities can be added to support the applications.

BRIEF DESCRIPTION OF DRAWINGS

FIG. 6 illustrates example categories of network functions which may be aggregated at a virtual router, according to at least some embodiments.

FIG. 8 is a flow diagram illustrating aspects of operations, pertaining to optimized execution of network functions, which may be performed at a cloud computing environment, according to at least some embodiments.

Figure 1:
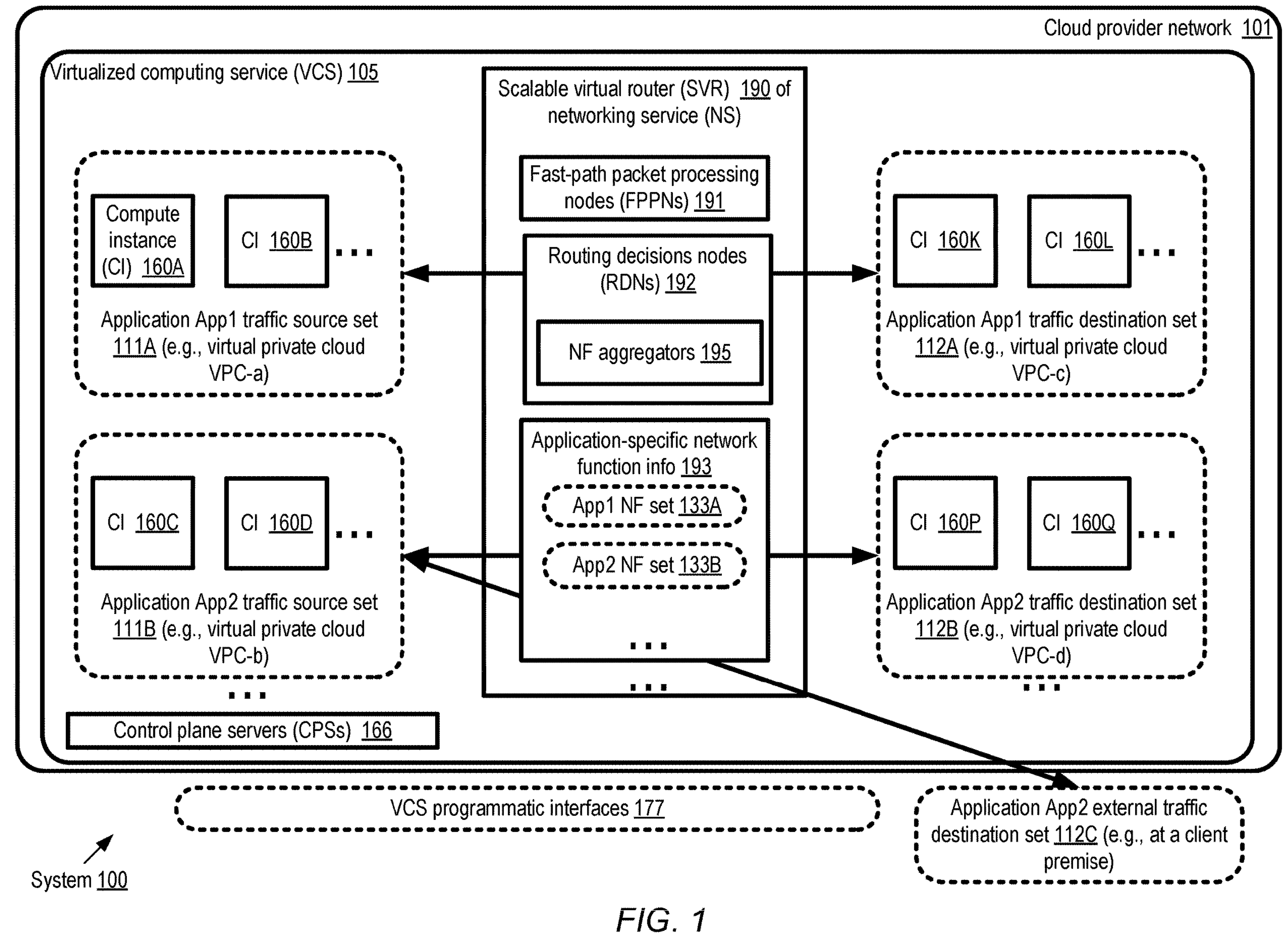
FIG. 1 illustrates an example system environment in which scalable cloud-based virtual routers may be used to optimize network function chains for customer packet flows, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

For certain cloud-based applications, packets flowing between different sets of resources may require several network functions (NFs) to be performed. In a virtualized computing service (VCS) of a cloud computing environment, resources can be organized into isolated virtual networks referred to as virtual private clouds (VPCs). When traffic flows from one VPC to another, an intermediary such as a multi-node scalable virtual router (SVR) processes the traffic, performing NFs like security checks and network address translation. Traditionally, routing network through NF sequences relies on a series of next-hop lookups. For example, when a packet P arrives at a SVR node, a routing table lookup determines the next destination D1 implementing function NF1. After NF1 transforms P into P', another lookup sends P' to another destination D2 for another network function NF2. In the cloud, this can mean that a packet is sent to different services for each NF.

The disclosed innovations can offer efficiency improvements over such a hop-at-a-time approaches to implementing sequences or chains of NFs, by introducing a more efficient approach called "playback routing" to implement service chains and sequences of network functions. Instead of performing a series of next-hop lookups that bounce packets between different resources, the playback routing technique simulates the entire path a packet would take through the required NFs during an initial route lookup procedure. This simulation collects and concatenates the sequence of operations (e.g. firewall, routing, geographic location, forwarding) that the packet's path would require into a single composite "mutation operation." This mutation operation is then installed directly on the fast data path of the routing mechanism such as an SVR. Thereafter, packets traversing this path execute the pre-computed mutation operation in a single hop, applying all the requisite NF transformations. This playback routing approach eliminates the need for multiple lookups and intermediate hops between separate NF implementation resources. It reduces latency, resource utilization, and complexity compared to traditional hop-by-hop service chaining. The one-time simulation allows the consolidation of an entire NF sequence into a single operation on the data plane for highly efficient packet processing. This also beneficially enables easier enforcement of location constraints (for example, that all packet processing for a flow occur within a specific zone).

The present disclosure relates to methods and apparatus for optimizing the execution of chains of network functions by performing network function aggregation or consolidation at SVRs. An SVR can comprise two types of nodes: fast-path packet processing nodes (FPPNs) and routing decisions nodes (RDNs). At a high level, for a given packet flow which is to be processed, an RDN can examine the requirements of the application to which the flow belongs (e.g., including NF requirements), and generate representations of packet processing actions which are to be taken for the various packets of the flow. A given packet flow can be distinguished from other packet flows by a tuple comprising, for example, a source network address (such as an Internet Protocol version 4 (IPv4) or Internet Protocol version 6 (IPv6) address), a source port, a destination network address, a destination port, a networking protocol identifier and/or other properties of the traffic. The RDN can propagate the generated actions (e.g., in the form of executable code which can be run fairly quickly) to a set of FPPNs. The FPPNs can then store the representations of the actions in local caches and apply the cached actions to received packets of the flow, typically without interacting with RDNs again with respect to the same packet flow. For the vast majority of packets of a given flow (which could comprise hundreds or thousands of packets), the FPPNs can efficiently execute cached actions.

In scenarios in which an NF chain comprising multiple NFs is to be executed on packets of a flow, an RDN of an SVR can analyze information available about the NF chain (e.g., descriptors provided by customers on whose behalf the NFs are run, route table entries created by the customers for routing packets between the different NF implementation resources, etc.) and determine whether a least a subset of the NFs can in effect be performed together at a single resource (e.g., a single FPPN) instead of being sent to several different resources for NF implementation. If the analysis indicates that such consolidation is feasible, the RDN can generate an aggregated NF, such that a result of applying the aggregated NF to a packet is the same as the result of applying multiple NFs of the chain in sequence. A representation of the aggregated NF can then be sent from the RDN to FPPNs. An FPPN can store the aggregated NF in its cache, apply the aggregated NF to packets of the flow, and perform packet processing actions based on the results of applying the aggregated NF. By combining NFs in this way, the total number of network hops that could otherwise be required can be reduced, and at least in some cases the total amount of processing resources (such as CPU cycles) used for the packet flows can be reduced. For example, it can be the case that the executable code used for the aggregated NF requires fewer processor cycles than if all the constituent NFs were executed separately. This can occur, for example, if some processing steps are common among different NFs, so those steps only need to be run once in the aggregated NF instead of being repeated in the different NFs.

Of course, in the case of some NF chains, the RDN may determine that at least some of the NFs cannot be aggregated and executed at a single resource (for example, some NFs may require access to customer data or programs which is not accessible to nodes of an SVR). In such cases, the RDN can use a best-effort methodology, and consolidate/combine as many NFs as feasible.

For some NF chains, in which a given NF can potentially be implemented in several different locations (such as within distinct availability zones of the cloud computing environment), the consolidation or aggregation of NFs can also enable enhanced support for location-constrained packet processing. For example, a customer of the VCS can indicate location constraints similar to "packets originating at a particular availability zone AZ1 should not be processed using resources in a different availability zone AZ2." Because the RDNs in effect simulate the entire logical path of the in-transit packets in order to generate aggregated NFs, they can ensure that such location or availability zone-based constraints are satisfied. If resources for implementing one of the NFs of the chain could ordinarily have been chosen from any of the availability zones at which the NF can run, the NF would instead be run at a resource (e.g., an FPPN, or a resource external to the SVR) selected to meet the location constraints.

As one skilled in the art will appreciate in light of this disclosure, certain embodiments may be capable of achieving various advantages, including some or all of the following: (a) reducing the overall latency for executing chains of network functions on packets flowing via cloud resources, (b) reducing network bandwidth requirements and processing requirements for NF chains, and/or (c) enabling location constraints specified by clients of cloud computing environments for their packet flows to be satisfied more easily.

According to some embodiments, a system may include one or more control plane servers (CPSs) of a networking service of a cloud computing environment, and a scalable virtual router (SVR) of the service. The networking service (NS) may be implemented as part of a virtualized computing service or VCS in one embodiment. The NS may also be referred to as a network function virtualization service, a packet processing service, a virtualized routing service, or a software defined networking service. The SVR may also be referred to as a virtual traffic hub, a transit gateway, or a virtual gateway. The SVR may comprise a plurality of nodes in various embodiments, including a set of routing decision nodes (RDNs) and a set of fast-path packet processing nodes (FPPNs). FPPNs may also be referred to as action implementation nodes or as elements of a fast data path of the NS. RDNs may sometimes be referred to as routing nodes. In some embodiments, SVRs may themselves be referred to as virtual routing nodes.

The NS may implement a set of programmatic interfaces (such as web-based consoles, command-line tools, application programming interfaces (APIs), graphical user interfaces and the like) in various embodiments, which may be used by clients to submit requests and messages pertaining to the clients' networking needs, and to receive corresponding responses. A CPS of the NS may receive, via such programmatic interfaces from a client in some embodiments, respective indications of a first set of NFs which are to be executed in a particular sequence or chain on packets directed from a set of traffic sources via the SVR to a set of traffic destinations. In some cases, at least some of the traffic sources and/or destinations may comprise resources such as virtual machines within the cloud computing environment or the VCS; in other cases, at least some of the traffic sources or destinations may lie outside the cloud computing environment's data centers, e.g., within a premise owned/managed by the client on whose behalf the NFs are to be executed. The chain or sequence of NFs may for example include a first NF followed by a second NF. Information about the chain of NFs (e.g., descriptors of the NFs, indicating the kinds of operations that are to be performed in the NFs, the route table entries associated with transmitting the packets to the resources where the NFs are to be implemented, executable code of NFs, etc.) may be provided to one or more RDNs of the SVR in various embodiments. The NF information provided by the client may in some embodiments indicate that a first resource which is to be identified via a first route table entry lookup is a candidate resource for execution of the first NF, and that a second resource which is to be identified via a second route table entry lookup (using the same route table, or a different route table) is a candidate resource for execution of the second NF.

An RDN of the SVR may determine that a particular FPPN of the SVR has received a first packet of a packet flow from one of the traffic sources of the set of traffic sources. Such a determination may be made, for example, as a result of a query directed to the RDN from the FPPN when the FPPN receives the first packet of the packet flow and discovers that the FPPN does not have a cached action corresponding to the packet flow.

In various embodiments, the RDN may generate, based at least in part on analyzing the information about the chain of network functions, an aggregated network function (ANF), such that a result of applying the aggregated network function to a particular packet of the packet flow is identical or logically equivalent to a result of applying at least the first NF followed by the second NF to the particular packet. ANFs may also be referred to as composed NFs, combined NFs, concatenated NFs, or composite NFs. The RDN may transmit a representation of the ANF to one or more of the FPPNs of the SVR, including the FPPN which had received the first packet. In at least one embodiment, the representation of the ANF which is sent by the RDN to an FPPN may comprise executable code for applying the ANF to packets.

The FPPN which received the first packet, and the ANF generated for the corresponding packet flow by the RDN, may in various embodiments perform a packet processing action with respect to the first packet using the ANF. Performing the packet processing action may comprise applying the ANF to the first packet, and performing a task based on the result of applying the ANF. For example, the result of applying the ANF may comprise (a) a transformed version of the first packet and (b) an indication of a target destination to which the transformed version is to be sent, and the packet processing action may also comprise transmitting the transformed version to the target destination. In some cases, the packet processing action may comprise dropping the packet instead of sending it on to a destination from the FPPN. The FPPN may store the ANF in a cache in various embodiments and re-use the cached ANF to process subsequent packets (if any) of the same flow that are received at the FPPN.

A variety of NFs may be combined into an ANF in some embodiments. For example, in one embodiment, applying an NF of the chain may comprise applying a security rule such as a firewall rule. The packet processing action taken by the FPPN using the corresponding ANF (which combines the logic of the security rule with logic of other NFs) may comprise causing at least a portion of the packet to a destination permitted by the security rule. In another example, one of the NFs of the chain may comprise modifying a particular header, and the packet processing action taken using the corresponding ANF may comprise causing a version of the packet, in which the particular header has been changed based on the NF, to be sent to a destination. In some cases, one of the NFs which has been aggregated may comprise modifying the data portion or payload of the packet (e.g., by encrypting a portion of the payload, and/or replacing subsets of the payload with other content), and the packet processing action taken by the FPPN may comprise causing a version of the packet in which such a payload modification has been performed to a destination. In one embodiment, one of the NFs of the chain may comprise creating an encapsulation packet within which the original packet (the version of the packet received by the FPPN) is included, and the action taken by the FPPN may comprise causing such an encapsulated packet comprising the original packet to be sent to a destination.

In one embodiment, the client on whose behalf the SVR is set up may provide processing location constraints for the client's packet flows. For example, the cloud computing environment may comprise a plurality of data center locations, or a plurality of availability zones, in one or more geographical regions. In such a scenario, the client may indicate constraints on which of the regions, availability zones, or data centers should be used (or which such locations should not be used) for processing packets of the packet flows in situations in which multiple such locations could be used. The packet processing action taken by an FPPN may comprise causing at least a portion of contents of a received packet to a particular location chosen in accordance with the location constraints. Note that even though availability zones may in some cases be used to express location constraints, in at least some embodiments packet processing location constraints may be specified independently of availability considerations. For example, a client may express location constraints logically equivalent to "do not process packets of these packet flows using resources located in country X," "process packets of these packet flows using only resources that are located within, and governed by laws of, legal jurisdiction LJ1," etc., without indicating availability zones as such.

An RDN may in some cases determine that not all the NFs of a chain of NFs can be consolidated into an aggregated NF. In various embodiments, if a particular NF cannot be consolidated with other NFs and run at an FPPN, the SVR may cause that particular NF to be implemented at a resource external to the SVR. If other NFs of the same chain can be consolidated, they may still be combined into an aggregated NF and run at an FPPN. In some embodiments, at least some nodes of an SVR may comprise or run at virtual machines or compute instances within an isolated virtual network or VPC of a VCS. In one embodiment, the consolidation and aggregation of at least a subset of a chain of NFS, followed by the execution of the aggregated NF, may be performed at other kinds of resources of a cloud computing environment, instead of being performed at nodes of an SVR.

In at least some embodiments, two or more SVRs may be linked to or peered with one another, e.g., as part of a wide-area networking (WAN) service at the request of a client of the VCS to enable traffic originating at one region of a cloud provider network to be sent to another region via a path which includes several SVRs. For example, SVRs SVR1 and SVR2 may be set up in regions R1 and R2 respectively and used to transmit packets between a first set of virtual machines V1 in R1 and a second set of virtual machines V2 in R2. Packets originating at V1 may by default be sent to SVR1, transmitted from SVR1 to SVR2 and then from SVR2 to V2. Respective sets of route tables may be associated with each SVR—e.g., route tables RT1 may be associated with SVR1, and route tables RT2 may be associated with SVR2. In some such scenarios, network functions of a chain of network functions may initially be specified such that lookups may have to be performed using route tables of several of the SVRs to identify resources at which the network functions should be performed. In at least some embodiments, an RDN at one of the SVRs (e.g., SVR1 in the above example) may obtain information from the control plane about all the NFs that are to be performed in the chain, despite the fact that route tables of another SVR would by default be used to select NF implementation resources for some of the NFs. That RDN may generate an aggregated NF that is equivalent to the entire chain (or a subset of the chain that would normally require operations at several SVRs) as described above. The aggregated NF may then be provided to an FPPN of one of the SVRs (e.g., SVR1) and implemented there on packets of corresponding flows. Thus, in effect, in such scenarios, at least some of the networking functionality that would otherwise be provided using route tables of multiple SVRs may be combined into operations performed at a single SVR, leading to further efficiency for packet processing.

According to some embodiments, a system may include a routing node of a virtualized routing service or networking service in a cloud provider network. The routing node may be configured to perform one or more route lookups to determine a sequence of NFs to be applied to a packet. The routing node may simulate execution of the determined sequence of network functions on the packet and generate an aggregated or composite operation (which may be referred to as a composite mutation operation) representing the cumulative effect of the NF sequence in various embodiments. The routing node may then install or transmit the composite mutation operation into a fast data path of the virtualized routing service. The fast data path may be configured to apply, in a single hop, the installed composite mutation operation on the packet to transform the packet according to the network function sequence, and forward the transformed packet towards a destination.

According to another embodiment, a computer-implemented method for efficient routing of packets through network functions may comprise performing one or more route lookups to determine a sequence of network functions to be applied to a packet. The computer-implemented method may further comprise simulating execution of the determined sequence of network functions on the packet to generate a composite mutation operation representing the cumulative effect of the network function sequence, and installing the composite mutation operation into a fast data path of a networking service, virtual router or virtual routing node. In some embodiments, the computer-implemented method may further comprise receiving a packet at the virtual routing node (e.g., at a component of the fast data path), and applying, in a single hop, the installed composite mutation operation to the packet to transform the packet according to the network function sequence. The transformed packet may be forwarded towards a destination.

In at least some embodiments, as indicated earlier, SVRs and at least some sources/destinations of traffic processed with the help of an SVR may be implemented at a cloud provider network. A cloud provider network or cloud computing environment (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network, including the VCS and various networking services) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which scalable cloud-based virtual routers may be used to optimize network function chains for customer packet flows, according to at least some embodiments. As shown, system 100 includes resources and artifacts of a virtualized computing service (VCS) 105 of a cloud computing environment or cloud provider network 101. The VCS may implement a set of programmatic interfaces 177, such as one or web-based consoles, application programming interfaces (APIs), command-line tools, graphical user interfaces and the like, which can be used by clients or customers of the VCS to submit requests and receive corresponding responses. Such clients may include owners or administrators of various applications run using compute instances (CIs) and/or other resources of the cloud provider network.

Some VCS client applications may require network packets generated at a set of traffic sources to be processed or transformed in various ways and transmitted to a set of traffic destinations. To facilitate such packet processing tasks, a networking service (NS) of the VCS may enable the establishment of scalable virtual routers (SVRs) in the depicted embodiment. A given SVR may comprise several types of nodes, including routing decisions nodes (RDNs) and fast-path packet processing nodes (FPPNs), and may in some cases be used for processing the traffic of several different applications (and/or several different VCS clients)

in a multi-tenant mode. An NS may also be referred to as a virtualized routing service in some embodiments.

In the scenario depicted in FIG. 1, an SVR 190 of an NS may be used for packet flows of two applications App1 and App2. Packets generated at application App1 traffic source set 111A may be sent to application App1 traffic destination set 112A via SVR 190, and packets generated at application App2 traffic source set 111B may be sent to application destination set 112B via SVR 190. Application App1 traffic source set 111A may for example comprise compute instance (CI) 160A and CI 160B within virtual private cloud (VPC) VPC-a, while App1 destination set 112A may comprise CI 160K and CI 160L in a different VPC VPC-c. Application App2 traffic source set 111B may for example comprise CI 160C and CI 160D within VPC-b, while App2 destination set 112B may comprise CI 160P and CI 160Q in VPC-d. In addition, the SVR may also be used to transmit (e.g., via VPN tunnels) App2 traffic from source set 111B to external traffic destination set 112C (e.g., at a client premise) in the depicted embodiment. Note that packets may flow in either direction between traffic source sets and traffic destination sets via SVR 190—e.g., packet flows may originate at a traffic source, and responses to the packets of the flows may be sent from a traffic destination back to the traffic source. Applications such as App1 and App2 may require a variety of NFs (e.g., NAT, encapsulation, etc.) to be applied to their packets in one or both directions on the paths between traffic sources and destinations in various embodiments.

VCS clients may inform control plane servers (CPSs) 166 (e.g., control plane servers of the NS and/or the VCS) regarding the sets or chains of NFs which are to be executed for their applications such as App1 and App2, and request establishment of an SVR such as SVR 190 for the applications. Application-specific network function information 193 accessible to, or stored at, nodes of the SVR may comprise App1 NF set 133A and App2 NF set 133B in the depicted embodiment. SVR 190 may comprise RDNs 192 and FPPNs 191. In some embodiments, the network function information may comprise NF descriptors describing the type of packet processing tasks required, and parameters of the packet processing tasks. In one embodiment, executable code that can be run to implement the NFs can be provided by VCS clients, e.g., as part of NF descriptors. In other embodiments, at least some of the information provided pertaining to an NF chain may be indicated via route table entries which can be used by RDNs to discover next hops of packets as the NFs are applied to the packets. A given RDN or FPPN may be implemented, for example, using one or more CIs of the VCS.

An RDN may comprise an NF aggregator 195 in the depicted embodiment. The NF aggregator may analyze the set of NFs (such as App1 NF set 133A or App2 NF set 133B) which are to be applied for the packets of a particular packet flow of a particular application, and determine whether any subset of the NFs (or all the NFs) can be combined into a single aggregated NF which is functionally equivalent to that subset of NFs (or all of the NFs). For example, consider a scenario in which the NF aggregator determines that NF1 and NF2 of an NF set of an application can be combined, where NF2 would be applied immediately after NF1 in the original NF chain. The aggregator may then generate NF-a, an aggregated or composite NF that has the following properties in the depicted embodiment: (a) NF-a can be applied to a packet at a single node or resources such as an FPPN, instead of being sent from one resource where NF1 is applied to another resource where NF2 is applied, and (b) the result of applying NF-a to a packet P is equivalent or identical to applying NF1 followed by NF2 to the packet. The NFs which are combined to generate the aggregated NF (NF-1 and NF-2 in the above example) may be referred to as baseline NFs. In various embodiments, applying some NFs to a packet may result in transforming the packet; in such embodiments, the final transformation result achieved by applying NF-a would be the same as the overall result of applying NF1 followed by NF2. Note that at least in some embodiments, applying an NF may not just result in modifying the packet, but may comprise taking a decision about the disposition of the packet—for example, applying the NF to the packet may result in determining that the packet is to be dropped instead of being forwarded, or applying the NF may result in selecting a particular location or availability zone to which the packet should be sent instead of another location or zone.

In at least some embodiments, the analysis and/or resulting aggregation of NFs at an RDN may be triggered by a query submitted from an FPPN. For example, in one embodiment, packets may initially be received from a traffic source at an FPPN selected using flow hashing (e.g., applying a hash function to components of a flow identifier of the packet, which can include a source and destination network address, a source and destination port, and a protocol identifier of the networking protocol being used for transmitting the packet). The recipient FPPN may perform a lookup (e.g., also based at least partly on the flow hash) in a cache maintained at the FPPN and determine whether the cache contains a representation of an action which is to be performed for packets of that flow. If the FPPN does not find a cache entry for the flow, a query may be sent (e.g., along with the received packet itself) to a selected RDN of the SVR. The RDN may then determine whether an aggregated NF can be generated for the flow. If such an aggregated NF can in fact be generated, it may be generated, and a representation of the aggregated NF may be sent in response to the query. The FPPN may store the representation in its cache and perform a packet processing action which includes applying the aggregated NF to the packet for which the query was sent to the RDN in various embodiments. The cached aggregated NF may be re-used or re-applied for subsequent packets of the flow by the FPPN. In one embodiment, the aggregated NF may be generated at an RDN in advance of receiving a query from an FPPN (e.g., as soon as information about the baseline NF chain of an application is received at the networking service), so that if and when a query is eventually received, the response can be provided more quickly to the FPPN.

A wide variety of baseline NFs may be combined to generate aggregated or composite NFs in various embodiments. For example, some baseline NFs may comprise modifying a header of a packet (e.g., for network address translation). Other NFs may comprise modifying a data payload of a packet (e.g., for encryption, to remove certain types of content from the payload, to translate payload text into a different language, etc.), encapsulating a packet in accordance with an encapsulation protocol, or applying a firewall rule or other types of security rules. For each type of baseline NF which is combined with other NFs, in various embodiments applying or executing the aggregated NF may have a similar effect with regard to the input packet as the baseline NF would have. For example, a header or payload may be modified by an aggregated NF which combines a packet modifying NF with other NFs, the packet may encapsulated by an aggregated NF which combines an encapsulation NF with other NFs, and/or a decision as to whether sending the packet towards its destination is permitted by a security rule may be made by an aggregated NF which combines a security rule application NF with other NFs.

In various embodiments, as part of the workflow of generating an aggregated NF for a packet (or a packet flow), the RDN may in effect simulate the operations that would be performed by the chain of baseline NFs, and/or determine a possible path (e.g., comprising various FPPNs and/or resources external to the SVR) that would be taken by the packet were it to flow through at least some baseline NFs of the chain. In some cases, there may be several functionally equivalent and/or performance-equivalent options available for one of the network hops that could be taken by the packet—for example, the same baseline NF could be executed at compute instances within several different availability zones or data centers, and the SVR may be able to choose among those locations. By default, in some cases, the location may be chosen at random from among the available location options. In some cases, an RDN may be able to choose an availability zone within which a FPPN used for the aggregated NF can be run.

In at least one embodiment, a client of the VCS may submit a processing location constraint or preference via programmatic interfaces 177, indicating that the client wishes to ensure that processing of packets of flows of the application be performed within a specified availability zone if possible, or that transmission of the packets to a particular location (e.g., a data center in a different country) should be avoided. Because of the simulation of the packet paths, the RDN may be able to enforce the constraints—e.g., by causing the processing of the packets (e.g., via an aggregated NF, or via a baseline NF which is not included in an aggregated NF) to be performed at a location such as an availability zone which was preferred by the client.

In some embodiments, a system may include a routing node of a virtualized routing service or networking service in a cloud provider network. The routing node may perform one or more route lookups to determine a sequence of NFs to be applied to a packet of a packet flow. The routing node may simulate execution of the determined sequence of network functions on the packet (i.e., compute or predict a result of applying all the NFs of the sequence on the packet) and generate an aggregated or composite operation (which may be referred to as a composite mutation operation) representing the cumulative effect of the NF sequence on the packet in various embodiments. The routing node may then install or transmit the composite mutation operation into a fast data path of the virtualized routing service—e.g., an executable version of the aggregated operation may be provided to one or more fast data path nodes. The fast data path may be configured to apply, in a single hop, the installed composite mutation operation on the packet to transform the packet according to the network function sequence, and forward the transformed packet towards a destination. In some cases, depending on the specific NFs involved, the packet may not necessarily be transformed by the aggregated operation; instead, one or more tasks such as content checking, security permission checking, etc. may be performed on the packet by the aggregated operation before the packet is sent towards its destination.

The operations corresponding to a sequence of NFs may be referred to as routing of packets through the NFs in some embodiments. According to one embodiment, a computer-implemented method for efficient routing of packets through network functions may comprise performing one or more route lookups to determine a sequence of network functions to be applied to a packet. The computer-implemented method may further comprise simulating execution of the determined sequence of network functions on the packet to generate a composite mutation operation representing the cumulative effect of the network function sequence, and installing the composite mutation operation into a fast data path of a networking service, virtual router or virtual routing node. In some embodiments, the computer-implemented method may further comprise receiving a packet at the virtual routing node (e.g., at a component of the fast data path), and applying, in a single hop, the installed composite mutation operation to the packet to transform the packet according to the network function sequence. The transformed packet may be forwarded towards a destination.

Figure 2:
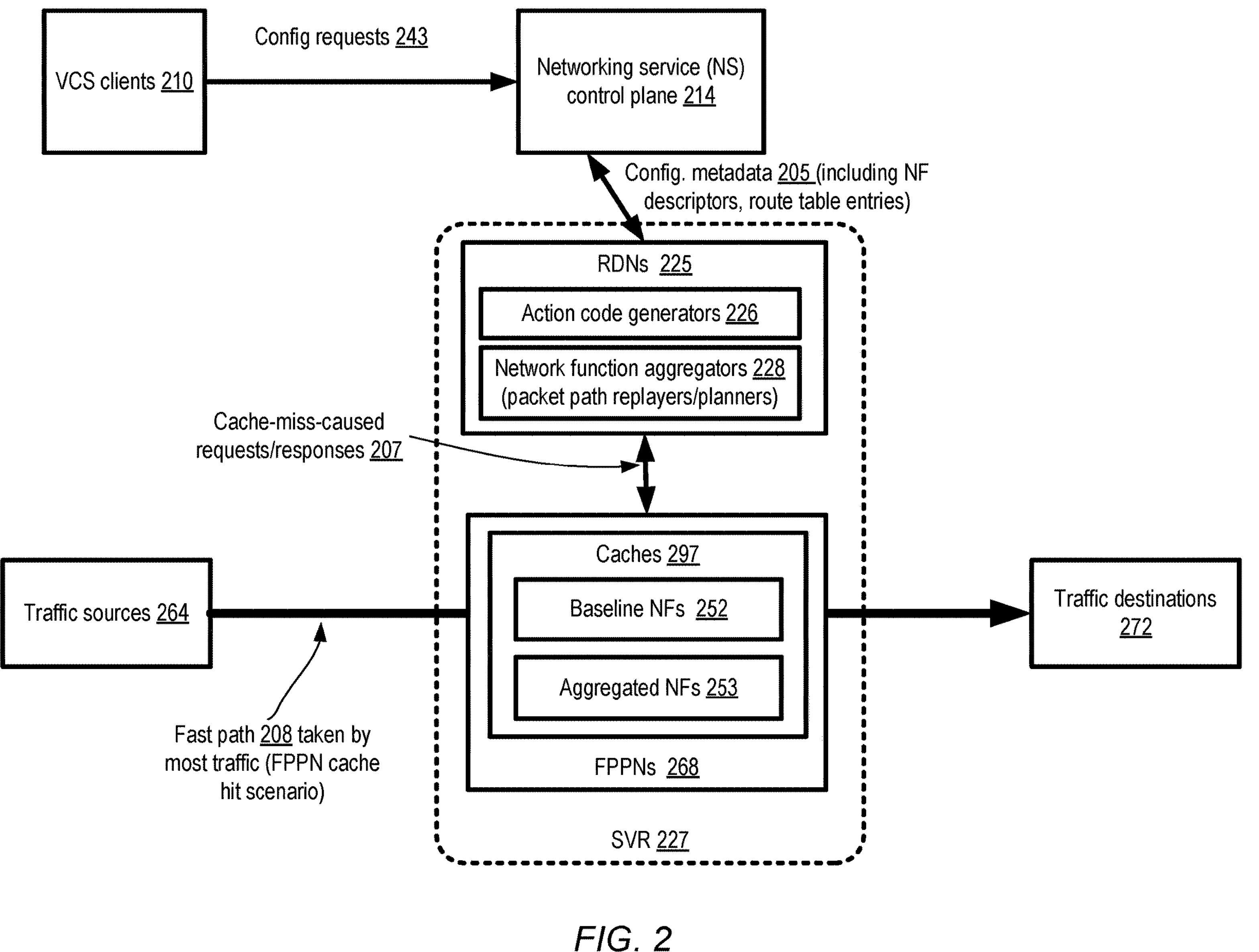
FIG. 2 illustrates example interactions among constituent nodes of virtual routers, according to at least some embodiments.

FIG. 2 illustrates example interactions among constituent nodes of virtual routers, according to at least some embodiments. An SVR 227 set up at a networking service (NS) at the request of a client may comprise some number of RDNs 225 and some number of FPPNs 268. VCS clients 210 may submit programmatic configuration requests 243 pertaining to their SVRs to the networking service, which may be handled at NS control plane 214 servers. For example, clients may provide information about NFs that are to be performed for various applications, set up route tables, associate VPCs with the SVR, and so on.

At least a subset of configuration metadata 205 provided by a client regarding the kinds of operations that are to be performed for an application whose traffic is handled by the SVR 227 may be propagated to RDNs 225 from the NS control plane 214 in the depicted embodiment. Such information may include NF descriptors, route table entries and the like.

An RDN may comprise, among other components, an action code generator 226 and/or one or more NF aggregators 228 in various embodiments. For some applications using SVR 227, network function aggregation may not be required; for example, only a single NF may be used for such an application. An action code generator 226 may generate executable code that can be used to perform packet processing tasks for such applications and transmit the code to a set of FPPNs assigned for the application. The provided action code may be stored in a respective cache 297 at individual ones of the FPPNs, e.g., using messages exchanged between the FPPNs and the RDNs as part of cache-miss-caused requests/responses 207.

For the traffic of other applications, multiple NFs may be employed. An NF aggregator 228 may analyze the configuration metadata pertaining to such an application and determine whether an aggregated NF that combines some or all of the NFs can be generated. The NF aggregator may simulate the path that would be taken by packets of such applications, in effect virtually replaying or simulating the path, and generate an aggregated NF that would have the same effect as the sequence of baseline NFs of the application, or a subset of baseline NFs of the sequence. Code representing the aggregated NF may be generated and sent to FPPNs for caching and execution on the packets of the application.

A cache 297 of an FPPN 268 may be used to store representations of baseline NFs 252 (for those NFs which are not aggregated or combined with other NFs) as well as aggregated NFs 253. When packets are received from traffic sources 264 of the application, the cached code representing the NF or NFs that are to be applied may be run with respect to the packets at the FPPNs. Depending on the nature of the NFs, in at least some cases a portion or all of the contents of a received packet (which may have been transformed by the baseline NF or the aggregated NF) may be transmitted to one or more traffic destinations 272. The fast path 208 taken by most packets of most packet flows, in cases in which the FPPN finds the appropriate NF entry for the packets in its cache and as such encounters a cache hit, may not involve interactions with the RDN. In some cases, e.g., when processing the very first packet of a given flow or in cases in which entries stored in the cache earlier for the flow happen to have been evicted, an FPPN may encounter a cache miss (i.e., an entry for the flow may not be found in the cache) and may submit a query to an RDN chosen for the flow. The RDN may then return an action comprising a baseline NF and/or an aggregated NF to the FPPN. Such cache-miss-causes requests/responses may be much less frequent than the fast path cases in various embodiments.

Figure 3:
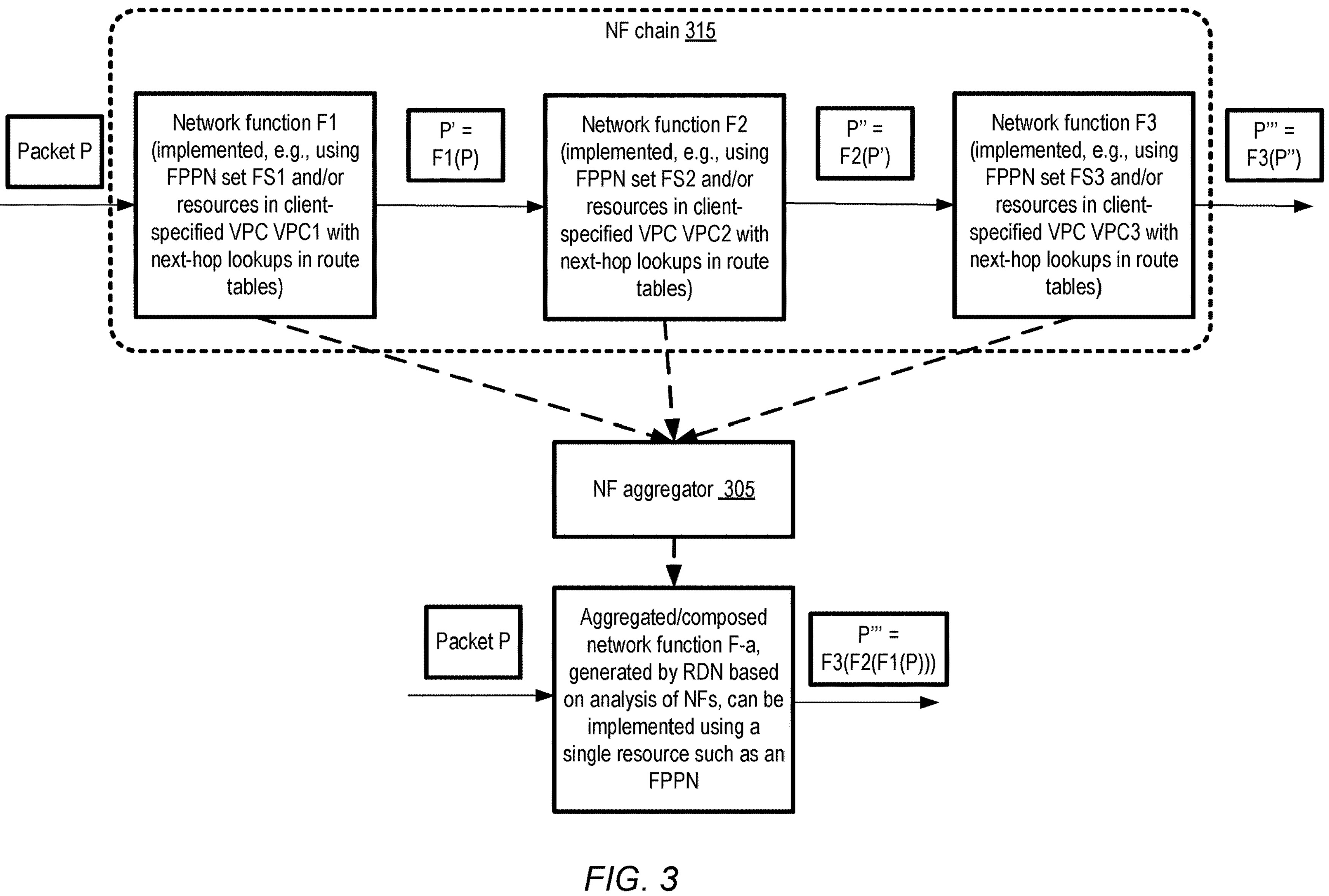
FIG. 3 illustrates an example of aggregation of network functions to improve performance achieved for packet flows, according to at least some embodiments.

FIG. 3 illustrates an example of aggregation of network functions to improve performance achieved for packet flows, according to at least some embodiments. In the depicted embodiment, an NF chain 315 comprising baseline NFs F1, F2 and F3 may be specified by a VCS client for packets of an application. To simplify the presentation, each of the example NFs of the chain 315 are assumed to transform packets in some way. If NF aggregation were not performed, each of the example NFs may be implemented at a different resource, such as a respective FPPN, or resources within a client specified VPC, requiring network communication between the resources. In at least some embodiments, for individual network functions, the resource at which the network function needs to be run may be identified using next-hop lookups in a route table associated with an SVR.

When NF1 is applied to a packet P, a transformed packet P' which can logically be represented as F1(p) may be created. When NF2 is applied to P', a second transformed version P" which can be represented as F2(P') may be generated. Similarly, when NF3 is applied to P", a third transformed packet P'" may be generated, which can be referred to as F3(P").

An NF aggregator 305 may examine information available to it regarding the NF chain 315 (e.g., descriptors of the NFs, code of the NFs, and/or route table entries pertaining to the NFs) in the depicted embodiment, and determine based on its analysis that an aggregated or composed network function F-a which is equivalent to the sequence of F1, F2 and F3 can be generated. Instead of sending packets to three different resources to obtain the result of the NF chain 315, a single resource such as an FPPN may be used to apply the aggregated network function. The output or result obtained from the aggregated NF may be functionally equivalent or identical to the result that would have been obtained by applying the three baseline network functions. For packet P, the transformed packet P'", representable as F3(F2(F1(P))) may be generated, for example. The benefits of using the aggregated NF may include, among others, that less network bandwidth would be required, the probability of retries or failures (which may occur if there is a temporary network failure between the resources used for the baseline NFs) may be reduced, and at least in some cases a smaller amount of computation cycles may be required (e.g., overhead associated with starting up programs implementing the baseline NFs may be avoided, or some computations common to the different baseline NFs may be avoided).

Figure 4:
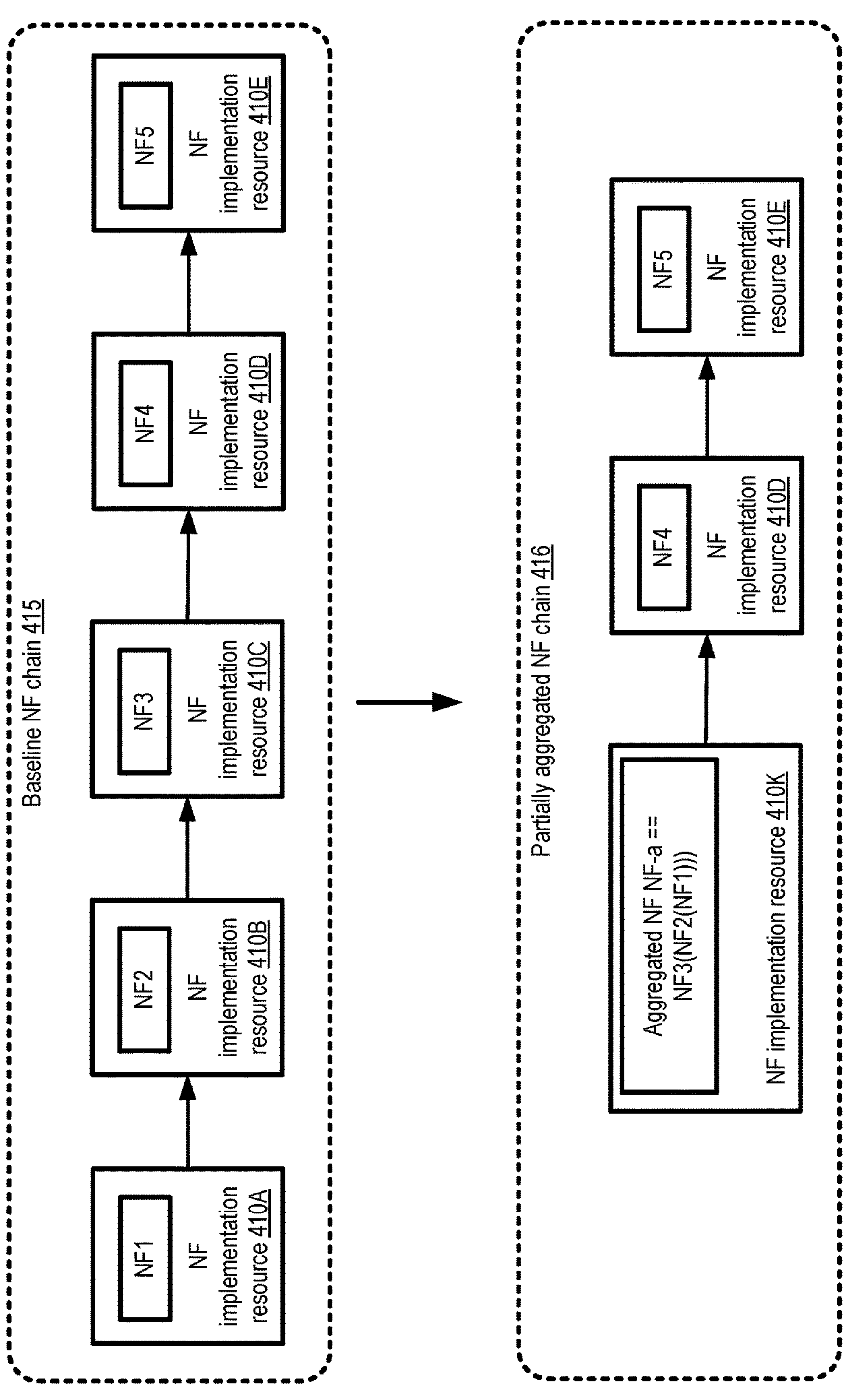
FIG. 4 illustrates an example of partial aggregation of a chain of network functions, according to at least some embodiments.

FIG. 4 illustrates an example of partial aggregation of a chain of network functions, according to at least some embodiments. A baseline NF chain 415 of an application of a VCS comprises five NFs which would by default be implemented or executed at respective resources. NF1 would be implemented at NF implementation resources 410A, NF2 would be implemented after NF1 at NF implementation resources 410B, NF3 would be implemented after NF2 at NF implementation resources 410C, NF4 would be implemented after NF3 at NF implementation resources 410D, and NF5 would be implemented after NF4 at NF implementation resources 410E.

After analyzing the NFs, an NF aggregator of an RDN of an SVR may determine that while NF1, NF2 and NF3 can be combined into a single aggregated NF that can then be run at a single implementation resource, NF4 cannot be combined with any other NF before or after it in the chain in the depicted example scenario. Accordingly, the NF aggregator may create an aggregated NF, NF-a, which is logically equivalent to the combination of NF1 followed by NF2 followed by NF3. NF-a may then be applied to packets at some NF implementation resource 410K, and the results of applying NF-a may be sent to NF implementation resource 410D where NF4 may be applied. The results obtained from NF4 may be supplied as input to NF5 at resources 410E, as in the baseline chain default scenario.

A number of reasons may prevent the consolidation of a particular NF such as NF4 into an aggregated NF in different embodiments. In some cases, for example, the NF may require access to data which cannot be easily obtained at any other resource than the resource indicated for it by the client on whose behalf chain 415 is to be executed. In other cases, the NF may require a specific type of software or device, such as a custom appliance, which cannot be accessed except at a particular resource indicated by the client. In one embodiment in which a client is given the option of deciding whether particular NFs of a chain should be consolidated if feasible, the client may send a programmatic request not to combine a particular NF such as NF4 with any other NF.

In various embodiments, the RDNs of the SVR may make a best effort attempt to combine as many NFs of a chain as is feasible. In some cases, instead of generating a single aggregated NF from a chain, multiple aggregated NFs which combine different subsets of the chain may be generated and executed. For example, consider another scenario in which a baseline NF chain comprises NFs NF1 through NF7. Assume further that NF4 of that chain cannot be combined with any other NFs for reasons such as those indicated above. If NF1, NF2 and NF3 can be combined with one another, and NF5, NF6 and NF7 can also be combined with one another, two aggregated NFs may be generated: NF-a1 which combines NF1, NF2 and NF3, and NF-a2 which combines NF5, NF6 and NF7. In this scenario, instead of running seven NFs using respective resources, a total of three NFs may be run as part of partially aggregated NF chain 416: NF-a1, followed by NF4, followed by NF-a2.

Figure 5:
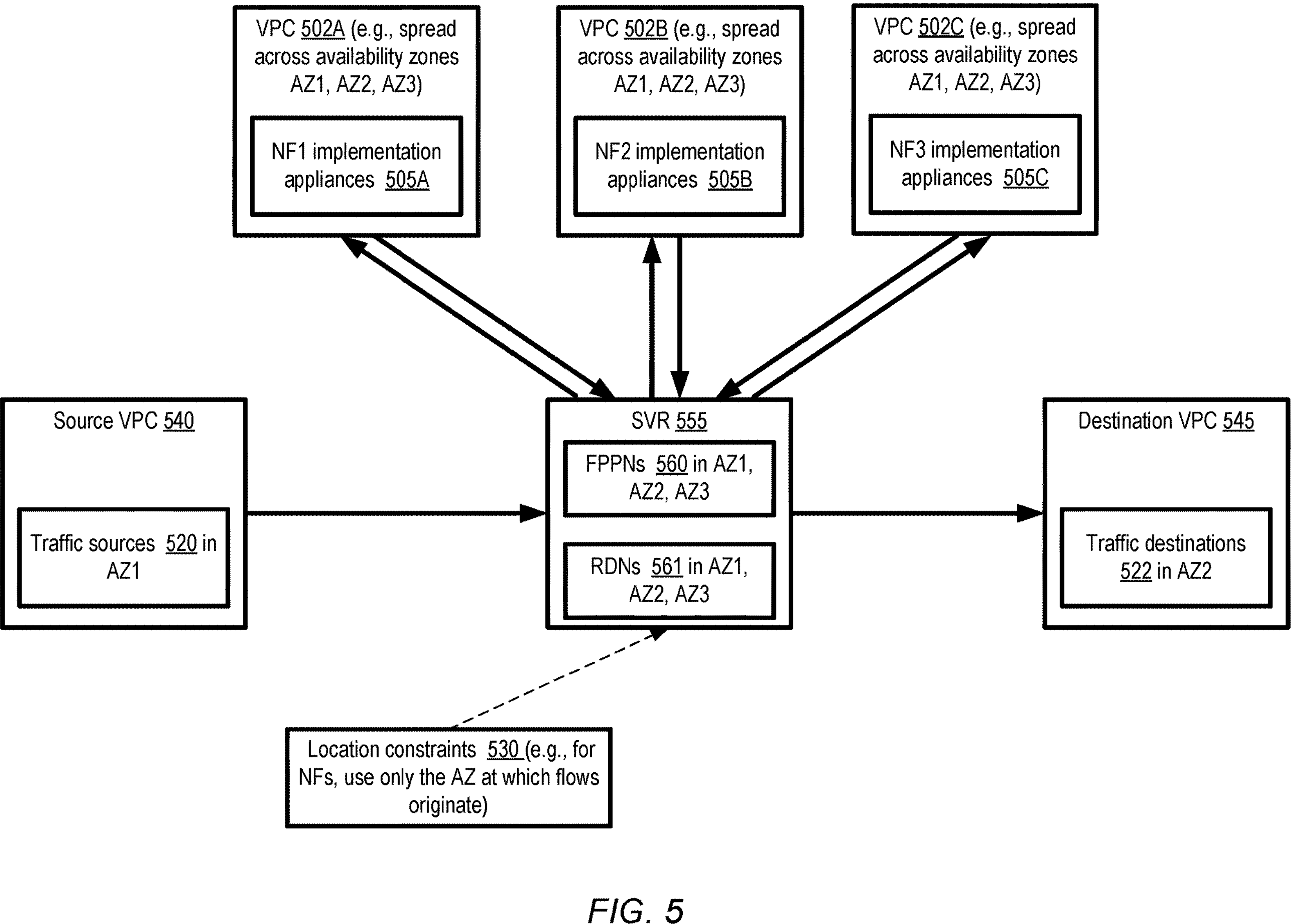
FIG. 5 illustrates an example scenario in which a customer's location constraints for packet processing may be satisfied with the help of a virtual router, according to at least some embodiments.

FIG. 5 illustrates an example scenario in which a customer's location constraints for packet processing may be satisfied with the help of a virtual router, according to at least some embodiments. An SVR 555 comprises FPPNs 560 divided among multiple availability zones (AZs) AZ1, AZ2 and AZ3 of a cloud provider network, to make the SVR tolerant to failures in up to two availability zones. The RDNs 561 of the SVR may also be similarly divided among the three availability zones.

A portion of network traffic of an application of a VCS client on whose behalf SVR 555 is set up may originate at traffic sources 520 within a source VPC 540 of a VCS in the depicted embodiment, and be directed towards traffic destinations 522 in a destination VPC 545. The traffic sources may be configured within AZ1, while the destinations may be configured within AZ2. Three types of network functions may have to be applied to the packets from the source VPC before delivery to the destination VPC 545 in the example scenario shown. NF1 implementation appliances 505A within a VPC 502A may execute a first network function NF1. NF2 implementation appliances 505B within a VPC 502B may execute a second network function NF2, and NF3 implementation appliances 505C within a VPC 502C may execute a third network function NF3. The appliances for implementing NF1, NF2 and NF3 may also be available from the three availability zones AZ1, AZ2 and AZ3.

Accessing the NF implementation appliances at VPCs 502A, 502B and 502C may require the SVR nodes to choose a particular AZ for each of the NFs in some embodiments. By default, AZs may be chosen at random by the SVR when several functionally equivalent AZ options are available. As a result, it may be the case, if the default approach is being used, that packets from traffic sources 520 in AZ1 are processed (i.e., NFs are applied to the packets) in any of the three AZs before they are delivered to traffic destinations 522.

The client on whose behalf SVR 555 is set up may specify location constraints 530 via programmatic interfaces to the networking service at which SVR 555 is implemented in the depicted embodiment. The constraints may, for example, indicate that for executing NFs, only the AZ at which packets originate should be used. Since the packets originate in AZ1, NF1, NF2 and NF3 should all be executed within AZ1 to satisfy the constraints. The SVR may therefore choose resources within AZ1 for all the NFs. If the RDNs are able to consolidate some or all of the NFs that would otherwise be implemented at the appliances 505A, 505B or 505C into an aggregated NF that can be run at an FPPN, FPPNs located within AZ1 may be used for the aggregated NF. If some or all of the NFs cannot be aggregated, the SVR may route packets to the appliances within AZ1 for those NFs, instead of choosing the AZs at random in the depicted embodiment. In at least one embodiment, other networking intermediary devices such as gateway load balancers may be used to access the appliances from the SVR. Such load balancers may also be chosen in accordance with the location constraints of the client by the SVR nodes. Because analysis of the NF chain by the RDNs includes the RDNs simulating the entire path that could or would be taken by packets before they are delivered to their destinations, the RDNs can plan out the path that is actually taken based at least in part on client-specified location constraints in the depicted embodiment. In some cases, location constraints that are not expressed in terms of availability zones, and are thus not associated with availability as such, may be indicated by a client and implemented to the extent possible by an SVR. For example, a client may indicate preferred or non-preferred countries or states, and the SVR or VCS may try to ensure that resources within the preferred countries/states are chosen for processing packets of the client's applications, or that resources within the non-preferred countries/states are not chosen.

FIG. 6 illustrates example categories of network functions which may be aggregated at a virtual router, according to at least some embodiments. Network address translation (NAT) 610 may comprise modifying one or more headers of a network packet, such as a source IP address and/or a source network port. NAT may be required for a variety of reasons for some applications, such as when the sources and/or the destinations are assigned network addresses within respective private address ranges of a VPC or similar isolated virtual network and hence source and network addresses may potentially conflict.

Encapsulation 612 is a network function which involves incorporating a baseline packet (also referred to as the encapsulated packet) within the payload portion of a larger encapsulation packet. Encapsulation may be used in a variety of scenarios, for example in cases in which the sources and destinations of packets are virtual machines or compute instances to which virtual addresses chosen from on overlay network are assigned, but the packets have to be physically transported between virtualization hosts that are configured within a substrate network with its own address ranges independent of the address ranges of the overlay network.

Policy-based filtering 614 can describe a number of different network functions that are used to choose actions taken for packets based on a client-specified policy or policies. One example is filtering using firewall rules or security groups, which restrict the set of sources or destinations for various packet flows. Another type of policy-based filtering network function may apply to data payloads—e.g., the data payloads may be analyzed to determine if they contain sensitive data defined by a client in a policy, and packets may be dropped if such sensitive data is detected.

Encryption 616 is another example of a packet content modifying network function. In some embodiments, network functions which implement scalable virtual private network connectivity 618, e.g., to enable packets from VPCs to be sent securely to external premises of the client via tunnels, may be implemented with the help of SVRs. Network segmentation 620 involves dividing a workload into subsets based on specified characteristics of the packets and processing the packets in segment-specific ways. Segmentation may for example be used heavily in telecommunication applications. In some cases, an NF may comprise customer-application-specific computations 622 indicated by a VCS client. Some or all of the kinds of network functions shown in FIG. 6 may be specified in a chain of baseline NFs indicated by a client in various embodiments, and combined into aggregated NFs by RDNs as described above. Other types of NFs, not shown in FIG. 6, may also be specified by clients and combined by RDNs in some embodiments. For example, in one embodiment, the disclosed technique of aggregating NFs can be applied to various types of NF sequences of telecommunication networks (such as fifth-generation or 5G applications). NF sequences in telecommunication applications may include, among others, Radio Access Network (RAN) NFs, core NFs and the like. Various combinations of such telecommunication NFs, which may otherwise be run at distinct resources, may be combined and run in a single step using the techniques introduced herein.

Figure 7:
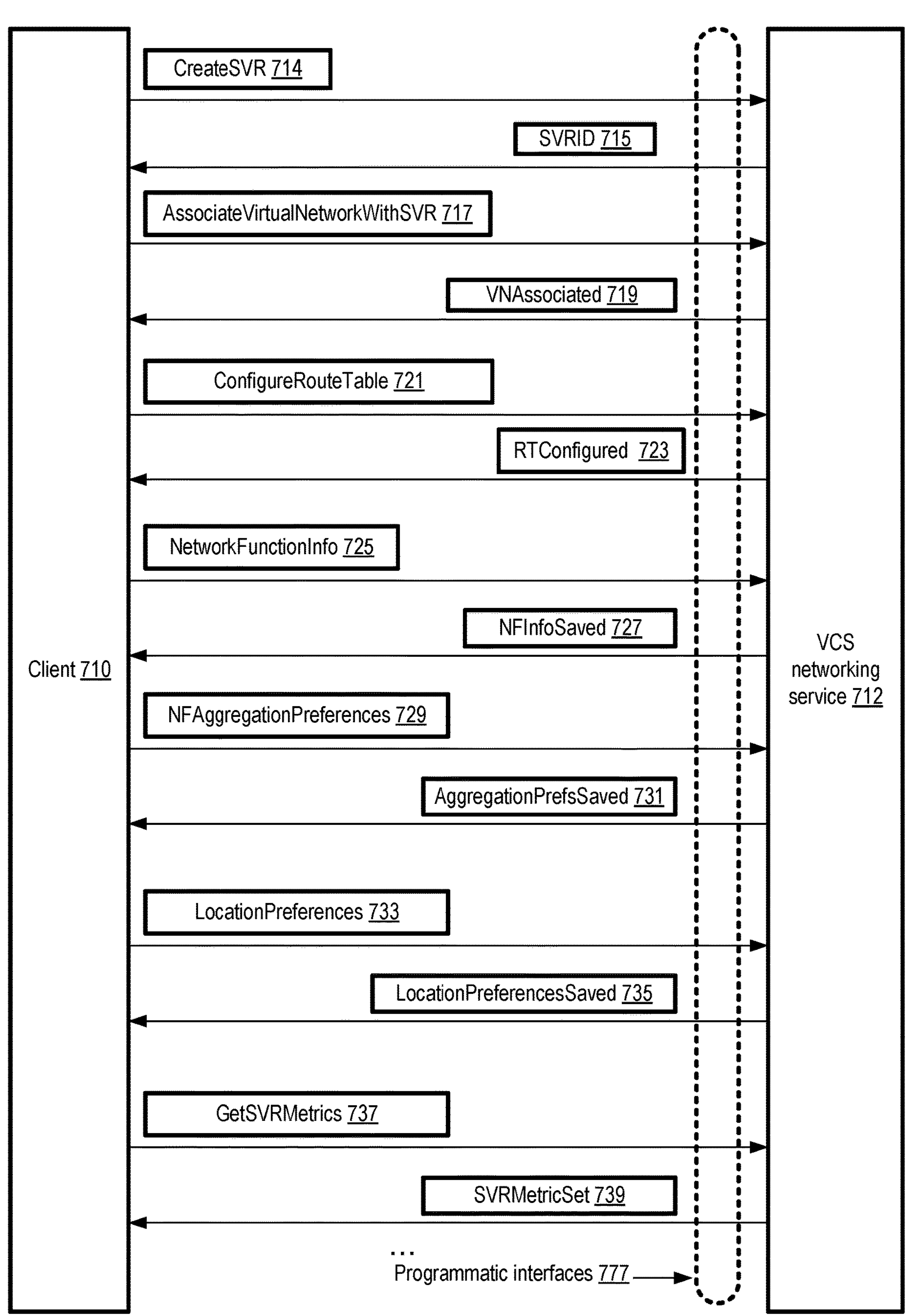
FIG. 7 illustrates example programmatic interactions, pertaining to the optimized execution of network functions, between customers and a network-accessible service of a cloud computing environment, according to at least some embodiments.

FIG. 7 illustrates example programmatic interactions, pertaining to the optimized execution of network functions, between customers and a network-accessible service of a cloud computing environment, according to at least some embodiments. A networking service (NS) 712 of a VCS similar in features and functionality to VCS 105 of FIG. 1 may implement a set of programmatic interfaces 777 in the depicted embodiment, such as one or more web-based consoles, command-line tools, graphical user interfaces and/or APIs. Clients 710 (e.g., owners/administrators of various applications whose traffic is to be processed at the networking service) may utilize the programmatic interfaces to submit requests and information pertaining to applications' network functions, and receive corresponding responses.

A client 710 may submit a CreateSVR request 714 in the depicted embodiment to request the establishment of an SVR for transmitting traffic in one or both directions between a set of traffic sources and a set of traffic destinations. Metadata indicating that the SVR has been created may be stored at the NS, and an identifier of the SVR may be provided via an SVRID message 715 to the client.

An Associate VirtualNetworkWithSVR request 717 may be submitted by the client in various embodiments to programmatically associate or attach an isolated virtual network such as a VPC or an on-premise network with the SVR, enabling the SVR to perform packet processing and routing/forwarding operations on packets sent to/from the network. Multiple virtual networks may be associated with the SVR using a single Associate VirtualNetworkWithSVR request in one embodiment. A VNAssociated message 719 may be sent to the client in some embodiments indicating that the requested association has succeeded. In some implementations, a set of FPPNs and RDNs may be configured as part of the SVR at the time of SVR creation; in other implementations, nodes may be configured for the SVR only when networks are programmatically attached to or associated with the SVR.

Clients may create route tables to be used by the SVR for routing the packets of the virtual networks, and add routes to the tables, by submitting ConfigureRouteTable requests 721 via the programmatic interfaces 777 in the depicted embodiment. The requested route table configuration operations may be performed, and an RTConfigured message 723 may be sent to the client.

A client may use a NetworkFunctionInfo message 725 to submit information about a set or chain of network functions to be performed on packets flowing between various pairs of associated networks via the SVR in some embodiments. The information may comprise descriptors of the network functions, the functional requirements of the network functions, executable code of the network functions, and/or an indication of particular route table entries that are used to send packets to resources (e.g., resources at VPCs other than VPCs that are the sources/destinations of the packets) at which the network functions may be performed. The NF information may be stored at a metadata store of the NS in some embodiments, and an NFInfosaved message 727 may be sent to the client.

In some embodiments, a client 710 may specify preferences regarding the manner in which NFs should be aggregated for their applications. An NFAggregationPreferences message 729 may be used for his purpose in the depicted embodiment. The preferences may, for example, indicate which subset of a chain of NFs the client wishes to have aggregated, or may identify specific NFs that are not to be aggregated by the NS. The preferences may be stored at the NS and applied for the client's traffic via the SVR set up for the client. An AggregationPrefsSaved message 731 may be sent to the client in some embodiments to indicate that the preferences have been recorded and will be applied. In at least one embodiment, the NS may provide the client an indication of the set of NFs that will be aggregated for the client's application, e.g., in a separate AggregationPlan message or in the AggregationPrefsSaved message.

According to one embodiment, a client 710 may submit an indication of preferences regarding where the client's NFs should be run, using one or more LocationPreferences messages 733. For example, the client may indicate that if an alternative is available, packets of the client's applications should preferably remain (and be processed within) the country where they originate, or that a specified set of availability zones should (or should not) be used for processing and/or transmitting the packets. The location preferences may be conditional in some cases—e.g., a client may indicate a given preference using the logical equivalent of a statement similar to "if the packet originates in availability zone AZ-a and is being sent to availability zone AZ-b, use AZ-a or AZ-b to execute the network functions if possible." The location-related preferences may be saved at the NS and used to select among NF implementation resources in different locations or availability zones when possible. A LocationPreferencesSaved message 735 may be sent to the client to acknowledge receipt of the preferences.

A number of metrics may be collected by the networking service with respect to the operations performed with the help of an SVR in some embodiments. Such metrics may include the rate at which packets are received/transmitted between various pairs of virtual networks attached to the SVR, the number of NFs of different types performed at the nodes of the SVR on such packets, the measured latency of transmitting packets between the virtual networks via the SVR, the number or ratio of packet flows for which client-specified location constraints (if any such constraints were indicated by the client) were met, and so on. A client may submit a GetSVRMetrics request 737 in some embodiments to view such metrics. One or more SVRMetricSet messages 739 comprising the requested metrics may be sent to the client from the NS. In at least some embodiments, programmatic interactions pertaining to optimization of network functions, other than those shown in FIG. 7, may be supported by a networking service of a VCS.

FIG. 8 is a flow diagram illustrating aspects of operations, pertaining to optimized execution of network functions, which may be performed at a cloud computing environment, according to at least some embodiments. As shown in element 801, an SVR may be established on behalf of a client of a networking service of a cloud computing environment, e.g., in response to one or more programmatic requests from the client. The SVR may be designated to transfer network traffic in one or both directions between various sets of traffic sources and destinations, e.g., including resources such as compute instances within VPCs and/or servers at external networks at premises outside the cloud computing environment. The SVR may comprise a set of RDNs and a set of FPPNs in various embodiments, some or all of which may themselves be implemented using compute instances within one or more service-owned VPCs. In at least some embodiments, the SVR nodes and/or the traffic sources and destinations may be distributed across multiple physical locations such as availability zones comprising one or more data centers.

A determination may be made of a sequence or chain of network functions NF1, NF2, NF3 . . . which are to be applied or executed on packet flows being transmitted via the SVR (element 804). In various embodiments, the client may use programmatic interfaces of the networking service to provide information about the NFs (including for example code which can be used to implement the NFs, or other descriptors of the NFs). The NF sequence may traditionally be implemented using single-hop lookups to route the packets to the resources at which each of the NFs is implemented. In at least some embodiments, the client on whose behalf the NFs are to be applied may use at least some SVR route table entries (which indicate next hops for various destinations) to indicate or provide information about the NFs of the chain.

A first packet of a flow PF1 may be received at a particular FPPN of the SVR (element 807). The FPPN may send a query or request to an RDN to determine how to process the packet, as its local cache may not have an entry for the flow PF1. The RDN may analyze the information about the NF chain, and generate an aggregate NF NF-A which is logically and functionally equivalent to at least some subset of the NFs of the chain (element 810). For example, the result of applying or executing NF-A may be identical to the result of applying all the NFs of the subset (e.g., NF1 followed by NF2).

The RDN may transmit a representation of NF-A (e.g., including executable code for NF-A) to the FPPN (element 813). The FPPN may cache NF-A locally, and perform a packet processing action with respect to the packet which was received at the FPPN using NF-A (element 816). The packet processing action may comprise applying NF-A to the packet, and in some cases may result in transforming the packet before sending it to one or more destinations. The cached version of NF-A may be re-used for processing of subsequent packets of the flow in various embodiments, without requiring the FPPN to interact further with the RDN for PF1. Note that depending on the subset of NFs that are aggregated into NF-A, in some cases the packet processing action may comprise dropping the packet instead of sending it to a destination. It is noted that in various embodiments, some of the operations shown in the flow diagram of FIG. 8 may be implemented in a different order than that shown in the corresponding figure, or may be performed in parallel rather than sequentially. Additionally, some of the operations shown in the flow diagram may not be required in one or more implementations.

Figure 9:
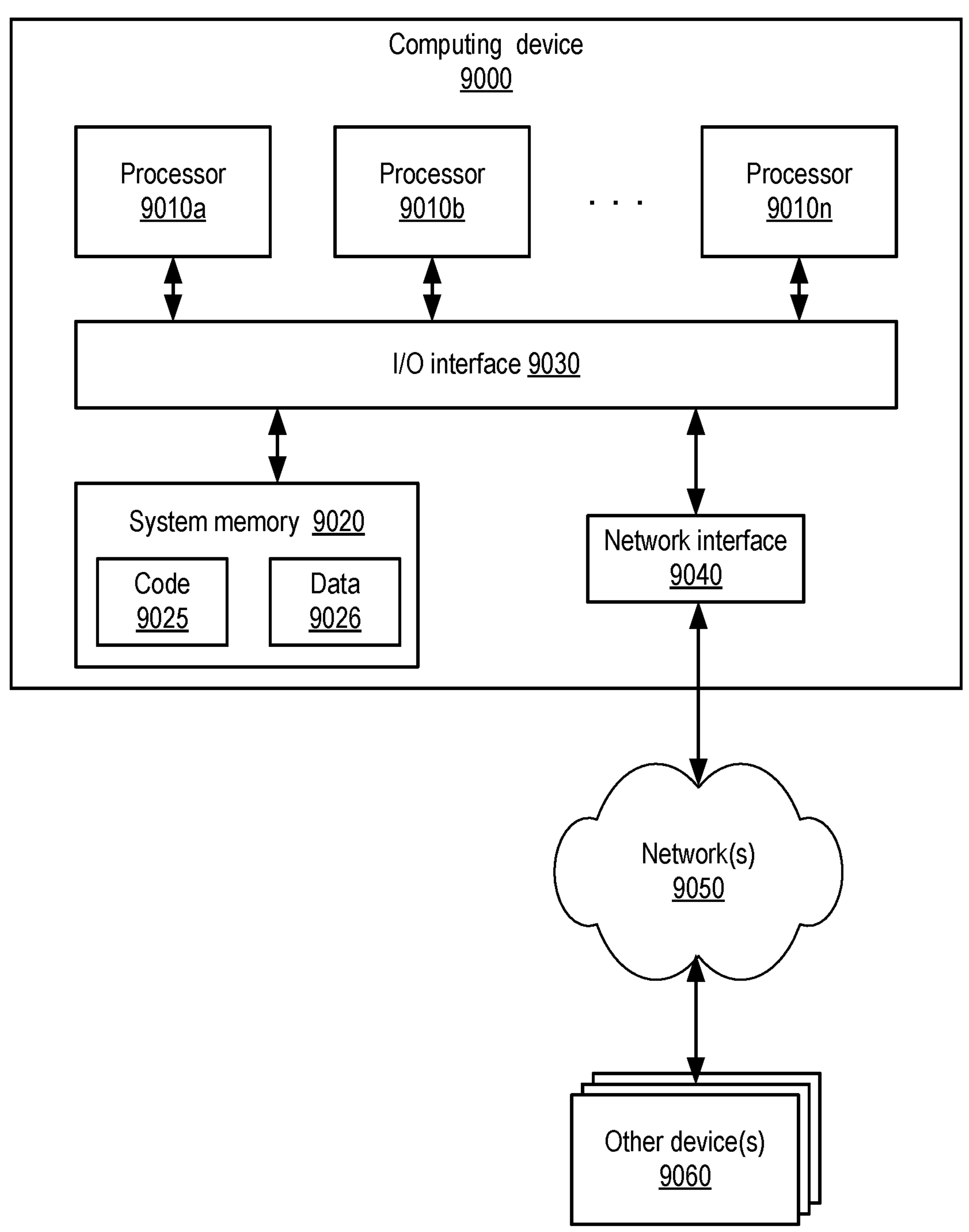
FIG. 9 is a block diagram illustrating an example computing device that may be used in at least some embodiments.

In at least some embodiments, a server that implements the types of techniques described herein (e.g., including the described functionality of SVR nodes, control plane servers, VCS virtualization hosts at which compute instances are run, etc.) may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

a control plane server of a networking service of a cloud computing environment; and a virtual router of the networking service, comprising a routing decisions node and a set of fast-path packet processing nodes;

wherein the control plane server is configured to:

receive, via one or more programmatic interfaces from a client of the networking service, indications of a set of network functions which are to be executed in a particular sequence on packets directed via the virtual router to a set of traffic destinations from a set of traffic sources within the cloud computing environment, wherein the particular sequence includes a first network function followed by a second network function;

wherein the routing decisions node is configured to:

determine that a particular fast-path packet processing node of the virtual router has received a first packet of a packet flow from a traffic source of the set of traffic sources;

generate, based at least in part on analysis of the set of network functions, an aggregated network function, such that a result of applying the aggregated network function to a particular packet of the packet flow using code generated for performance of the aggregated network function is identical to a result of applying at least the first network function followed by the second network function to the particular packet, wherein information pertaining to the set of network functions is obtained at the routing decisions node from the control plane server; and transmit a representation of the aggregated network function to the particular fast-path packet processing node; and wherein the particular fast-path packet processing node is configured to:

perform, with respect to the first packet, a packet processing action which comprises applying the aggregated network function, which was generated based at least in part on the analysis of the set of network functions after receiving the first packet at the particular fast-path packet processing node, to the first packet.

2. The system of claim 1, wherein the first packet belongs to a particular packet flow, and wherein the particular fast-path packet processing node is further configured to:

store the representation of the aggregated network function in a cache; and retrieve the representation from the cache to perform a packet processing action on a second packet of the particular packet flow.

3. The system of claim 1, wherein applying the first network function comprises applying a firewall rule, and wherein to perform the packet processing action, the particular fast-path packet processing node is further configured to:

cause at least a portion of the first packet to be sent to a destination permitted by the firewall rule.

4. The system of claim 1, wherein applying the first network function to a particular packet comprises modifying a particular header of the particular packet, and wherein to perform the packet processing action, the particular fast-path packet processing node is further configured to:

cause a version of the first packet in which the particular header has been modified according to the first network function to be sent to a destination.

5. The system of claim 1, wherein applying the first network function to a particular packet comprises modifying a portion of a payload of the particular packet, and wherein to perform the packet processing action, the particular fast-path packet processing node is further configured to:

cause a version of the first packet in which the payload has been modified according to the first network function to be sent to a destination.

6. A computer-implemented method, comprising:

generating an aggregated network function based at least in part on analysis of a set of network functions, such that a result of applying the aggregated network function to a packet using code generated for performance of the aggregated network function is equivalent to a result of applying at least (a) a first network function of the set and (b) a second network function of the set to the packet, wherein the set of network functions is indicated to a control plane of a networking service by a client;

transmitting a representation of the aggregated network function to a packet processing node of a virtual router of the networking service; and implementing, by the packet processing node, with respect to a first packet, a packet processing action which includes applying the aggregated network function, which was generated based at least in part on the analysis of the set of network functions after receiving the first packet at the packet processing node, to the first packet.

7. The computer-implemented method of claim 6, wherein applying the first network function comprises applying a firewall rule, and wherein the packet processing action implemented by the packet processing node comprises:

causing at least a portion of the first packet to be sent to a destination permitted by the firewall rule.

8. The computer-implemented method of claim 6, wherein applying the first network function to a particular packet comprises modifying a particular header of the particular packet, and wherein the packet processing action implemented by the packet processing node comprises:

causing a version of the first packet in which the particular header has been modified according to the first network function to be sent to a destination.

9. The computer-implemented method of claim 6, wherein applying the first network function to a particular packet comprises modifying a portion of a payload of the particular packet, and wherein the packet processing action implemented by the packet processing node comprises:

causing a version of the first packet in which the payload has been modified according to the first network function to be sent to a destination.

10. The computer-implemented method of claim 6, wherein applying the first network function to a particular packet comprises generating an encapsulation packet within which the particular packet is stored, and wherein the packet processing action implemented by the packet processing node comprises:

causing an encapsulated packet comprising the first packet to be sent to a destination.

11. The computer-implemented method of claim 6, further comprising:

determining a processing location constraint of a packet flow comprising the first packet, wherein the packet processing action implemented by the packet processing node comprises causing at least a portion of the first packet to be sent to a resource at a particular location, wherein the particular location is selected in accordance with the processing location constraint.

12. The computer-implemented method of claim 6, wherein the first packet belongs to a particular packet flow, the computer-implemented method further comprising:

storing the representation of the aggregated network function in a cache at the packet processing node; and retrieving, at the packet processing node, the representation from the cache to process a second packet of the particular packet flow.

13. The computer-implemented method of claim 6, wherein the representation of the aggregated network function comprises executable code generated at a decisions node of the virtual router.

14. The computer-implemented method of claim 6, wherein the networking service is implemented at a cloud computing environment, the computer-implemented method further comprising:

receiving the first packet at the packet processing node from a virtual machine within a virtual private cloud (VPC) of the cloud computing environment.

15. The computer-implemented method of claim 6, wherein the networking service is implemented at a cloud computing environment, and wherein the packet processing action implemented by the packet processing node comprises:

causing at least a portion of contents of the first packet to be received at a destination external to the cloud computing environment.

16. A non-transitory computer-accessible storage medium storing program instructions that when executed on a processor:

analyze a set of network functions, wherein the set of network functions is indicated for a set of packet flows by a client of a networking service;

generate an aggregated network function based at least in part on analysis of the set of network functions, such that a result of applying the aggregated network function to a packet using code generated for performance of the aggregated network function is equivalent to a result of applying at least (a) a first network function of the set to the packet and (b) a second network function of the set to the packet; and implement, with respect to a particular packet of a packet flow of the set of packet flows, a packet processing action which includes applying the aggregated network function, which was generated based at least in part on the analysis of the set of network functions after receiving the particular packet, to the particular packet.

17. The non-transitory computer-accessible storage medium of claim 16, wherein applying the first network function comprises applying a firewall rule, and wherein to implement the packet processing action, the non-transitory computer-accessible storage medium stores further program instructions that when executed on the processor:

cause at least a portion of the particular packet to be sent to a destination permitted by the firewall rule.

18. The non-transitory computer-accessible storage medium of claim 16, wherein applying the first network function to the particular packet comprises modifying a particular header of the particular packet, and wherein to implement the packet processing action, the non-transitory computer-accessible storage medium stores further program instructions that when executed on the processor:

cause a version of the particular packet in which the particular header has been modified according to the first network function to be sent to a destination.

19. The non-transitory computer-accessible storage medium of claim 16, wherein the set of network functions comprises a third network function, wherein the packet processing action is implemented at a particular node of a virtual router, the non-transitory computer-accessible storage medium storing further program instructions that when executed on the processor:

cause the third network function to be applied to the particular packet at a resource other than the particular node.

20. The non-transitory computer-accessible storage medium of claim 19, wherein the resource other than the particular node is configured within a virtual private cloud indicated by the client.

* * * * *